United States Patent [19]

Terunuma et al.

[11] Patent Number: 5,262,915
[45] Date of Patent: Nov. 16, 1993

[54] MAGNETIC HEAD COMPRISING A SOFT MAGNETIC THIN FILM OF FENIZRN HAVING ENHANCED (100) ORIENTATION

[75] Inventors: Kouichi Terunuma; Masahiro Miyazaki, both of Tokyo, Japan

[73] Assignee: TDK Corporation, Tokyo, Japan

[21] Appl. No.: 617,180

[22] Filed: Nov. 23, 1990

[30] Foreign Application Priority Data

Aug. 23, 1990 [JP] Japan .................. 2-223771

[51] Int. Cl.$^5$ .............................. G11B 5/235
[52] U.S. Cl. ...................... 360/120; 428/900; 428/694 MT
[58] Field of Search ............... 428/694, 900; 360/110, 360/120

[56] References Cited

U.S. PATENT DOCUMENTS

| | | | |
|---|---|---|---|
| 4,690,744 | 9/1987 | Naoe et al. | 204/192.11 |
| 4,836,865 | 6/1989 | Sakakima et al. | 148/306 |
| 5,028,280 | 7/1991 | Ihara et al. | 148/306 |
| 5,049,209 | 9/1991 | Sakakima et al. | 148/306 |

FOREIGN PATENT DOCUMENTS

0380136A 8/1990 European Pat. Off. .
60-218820 11/1985 Japan .
60-220913 11/1985 Japan .
62-210607 9/1987 Japan .
64-15907 1/1989 Japan .
2-123705 5/1990 Japan .

Primary Examiner—Stevan A. Resan
Attorney, Agent, or Firm—Oblon, Spivak, McClelland, Maier & Neustadt

[57] ABSTRACT

The soft magnetic thin film of the invention has an atomic ratio composition of the formula:

$$[(Fe_{1-y}Ni_y)_{1-x}M_x]_{1-z}N_z$$

wherein M is at least one member selected from the group consisting of Mg, Ca, Ti, Zr, Hf, V, Nb, Ta, Cr, Mo, W, Mn, and B, $0.001 \leq x \leq 0.15$, $0 \leq y \leq 0.1$, and $0.001 \leq z \leq 0.15$, and has a relative intensity ratio of Fe (200) peak to Fe (110) peak in an X-ray diffraction spectrum of at least ⅔ and high Fe (100) orientation. It has excellent soft magnetic properties in that it has a high saturation magnetic flux density Bs, heat resistance, a low coercive force Hc, and a high magnetic permeability $\mu$. A magnetic head using such a thin film has improved overwrite properties, recording/reproducing sensitivity, and electromagnetic properties, and is highly reliable.

7 Claims, 3 Drawing Sheets

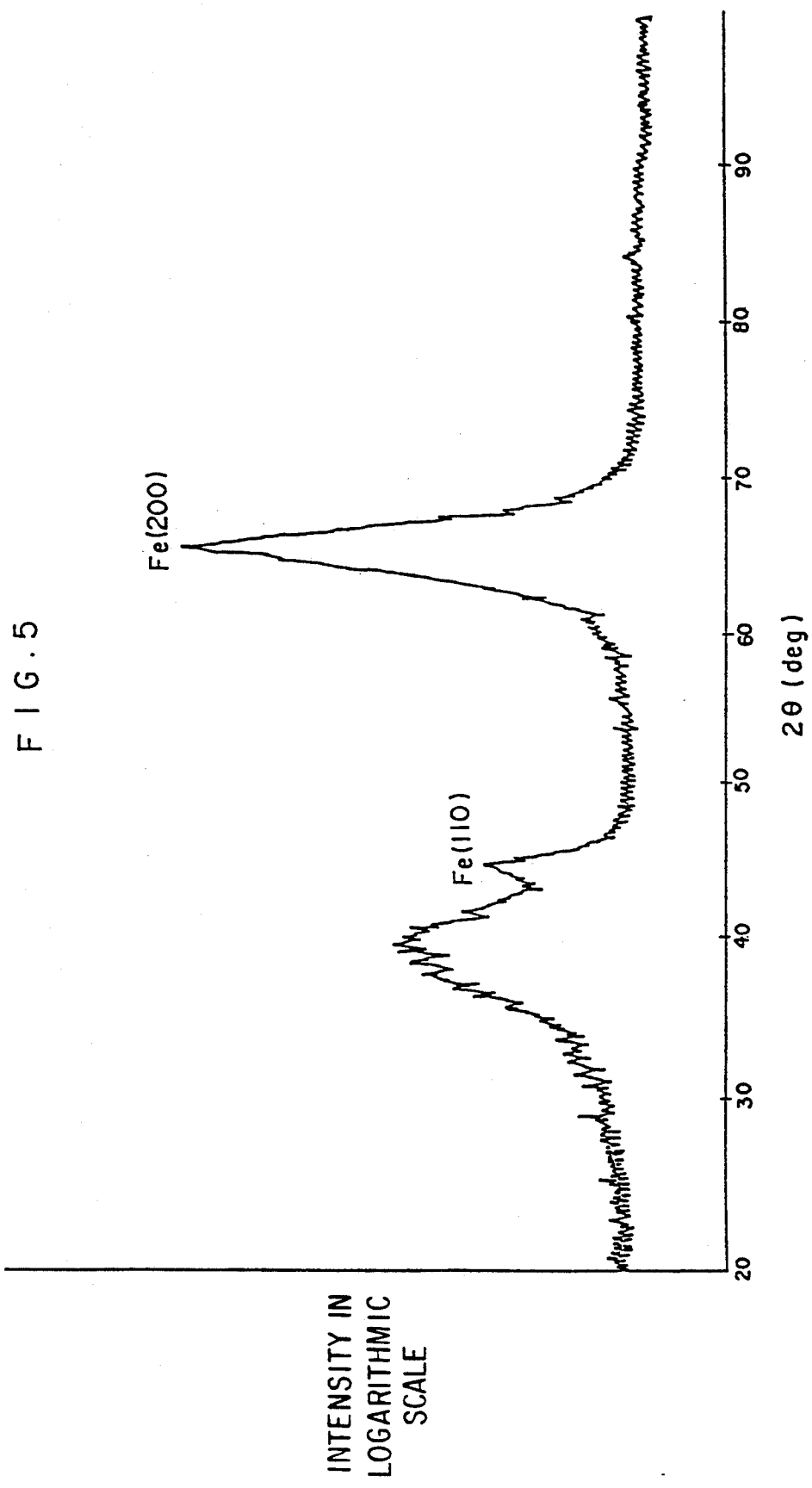

MAGNETIC HEAD COMPRISING A SOFT MAGNETIC THIN FILM OF FENIZRN HAVING ENHANCED (100) ORIENTATION

FIELD OF THE INVENTION

This invention relates to a soft magnetic thin film and a magnetic head, more particularly to a metal-in-gap (MIG) type magnetic head, enhanced dual gap length (EDG) type magnetic head, and thin film magnetic head.

BACKGROUND OF THE INVENTION

MIG type magnetic heads are known which include first and second cores of ferrite and a soft magnetic thin film of Sendust or the like on the gap-facing surface of at least one of the cores, the thin film having a higher saturation magnetic flux density Bs than the cores.

These magnetic heads are effective for recording information in magnetic recording media having a high coercive force because an intense magnetic flux can be applied from the soft magnetic thin film to the media.

Also, flying type thin film magnetic heads now find commercial application by virtue of their excellent properties including high density recording and high speed data transfer.

Further, thin film magnetic heads use soft magnetic thin films of Permalloy, Sendust and similar materials having a high saturation magnetic flux density Bs as upper and lower magnetic pole layers for generating a magnetic flux of a high density.

It should be noted that these soft magnetic thin films used in magnetic heads have a saturation magnetic flux density Bs of at most about 12,000 G.

Therefore, conventional magnetic heads have insufficient overwrite and other electromagnetic properties while a higher saturation magnetic flux density Bs is required for magnetic recording media having a high coercive force.

Further, Fe base soft magnetic thin films having enhanced (100) orientation are known to exhibit excellent soft magnetic properties due to low crystallographic magnetic anisotropy.

However, conventional gas phase methods such as sputtering fail to form Fe base soft magnetic thin films having enhanced (100) orientation, but rather result in thin films having orientation in (110) plane or no orientation.

The fabrication of thin films having enhanced (100) orientation requires the use of substrates of special materials such as ZnSe or monocrystalline substrates of GaAs or the like which have (100) orientation or an enhanced degree of (100) orientation.

Since thin films having enhanced (100) orientation can be formed only under limited conditions, it is very difficult for magnetic heads to have soft magnetic thin films which have (100) orientation or an enhanced degree of (100) orientation.

In turn, Fe—N soft magnetic thin films having a higher saturation magnetic flux density Bs than Sendust can be formed by sputtering an Fe target in a gas mixture of Ar and $N_2$.

This is because by mixing N, finer crystal grains of Fe are formed and magnetic anisotropy dispersion is reduced.

For example, Japanese Patent Application Kokai No. 15907/1989 discloses a soft magnetic thin film based on Fe and containing iron nitride in the form of $Fe_4N$ and/or $Fe_3N$.

This soft magnetic thin film has magnetic properties suitable as magnetic heads as typified by a saturation magnetic flux density of 15,000 G or higher and a low coercive force Hc.

The Fe—N soft magnetic thin films, however, are less heat resistant so that they experience a rapid rise of coercive force Hc at a temperature of the order of 350° C. since their grain size increases at such temperatures.

These soft magnetic thin films are thus difficult to apply to magnetic heads of the MIG and EDG types in which temperatures of about 450° to 700° C. are encountered during glass welding and other heat treatment as well as thin film magnetic heads in which temperatures of about 350° C. or higher are encountered during film formation as by sputtering. In addition, they cannot be enhanced in (100) orientation simply by forming films on conventional substrates by sputtering and other gas phase methods.

SUMMARY OF THE INVENTION

An object of the present invention is to provide a soft magnetic thin film which is resistant against heat and corrosion and has a high saturation magnetic flux density Bs and excellent soft magnetic properties as well as an MIG type magnetic head, EDG type magnetic head, and thin film magnetic head having such a soft magnetic thin film.

This and other objects are achieved by the present invention which is defined below as items (1) to (8).

(1) A soft magnetic thin film having an atomic ratio composition of the formula:

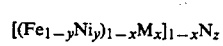

wherein M is at least one member selected from the group consisting of Mg, Ca, Ti, Zr, Hf, V, Nb, Ta, Cr, Mo, W, Mn, and B, $0.001 \leq x \leq 0.15$, $0 \leq y \leq 0.1$, and $0.001 \leq z \leq 0.15$, and having a relative intensity ratio of Fe (200) peak to Fe (110) peak in an X-ray diffraction spectrum of at least ⅓.

(2) A soft magnetic thin film having an atomic ratio composition of the formula:

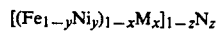

wherein M is at least one member selected from the group consisting of Mg, Ca, Ti, Zr, Hf, V, Nb, Ta, Cr, Mo, W, Mn, and B, $0.001 \leq x \leq 0.15$, $0 \leq y \leq 0.1$, and $0.001 \leq z \leq 0.15$, and having Fe (200) plane orientation in an electron diffraction spectrum.

(3) The soft magnetic thin film of (1) or (2) which has been heat treated at a temperature of 200° to 800° C.

(4) The soft magnetic thin film of any one of (1) to (3) which has a saturation magnetic flux density Bs of at least 14,000 G and a coercive force Hc of up to 2 Oe.

(5) A magnetic head having a soft magnetic thin film according to any one of (1) to (4) between a pair of cores.

(6) The magnetic head of (5) wherein the pair of cores are integrally welded with a fusion welding glass having a working temperature Tw of 450° to 700° C.

(7) In a thin film magnetic head comprising an upper magnetic pole layer, a lower magnetic pole layer, and a protective layer, the improvement wherein said upper and lower magnetic pole layers are formed of a soft magnetic thin film according to any one of (1) to (4).

(8) A magnetic head comprising a soft magnetic thin film according to any one of (1) to (4) formed on a substrate, said thin film constituting a magnetic circuit.

The soft magnetic thin films of the present invention best suited for magnetic heads are of Fe—N system and thus have a significantly high saturation magnetic flux density Bs and a low coercive force Hc.

By adding an adequate amount of a specific element or elements to Fe and N, soft magnetic thin films which have (100) orientation or an enhanced degree of (100) orientation can be formed on any substrates. Soft magnetic properties are outstandingly improved.

In addition, the additive element or elements form more stable nitrides than Fe so that heat resistance and corrosion resistance are significantly improved while maintaining a saturation magnetic flux density Bs of at least about 14,000 G, especially at least 16,000 G.

The soft magnetic thin films of the invention have a heat resistant temperature of about 500° C. or higher provided that the heat resistant temperature is a temperature at which the coercive force rapidly changes during heat treatment, for example, a heat treating temperature at which the coercive force Hc reaches 2 Oe.

Therefore, the soft magnetic thin films of the invention have excellent soft magnetic properties including a high saturation magnetic flux density Bs, a low coercive force Hc, and a high magnetic permeability $\mu$.

The magnetic heads having such soft magnetic thin films according to the present invention, therefore, have improved electromagnetic properties including overwrite ability and high recording/reproducing sensitivity.

In addition, the magnetic heads are well reliable since the soft magnetic thin films of the invention are resistant against corrosion and wear.

It is to be noted that Japanese Patent Application Kokai Nos. 218820/1985 and 220913/1985 disclose magnetic thin films comprising Fe, 2 to 10% by weight of Al, 3 to 16% by weight of Si, and 0.005 to 4% by weight of nitrogen.

It is described that the saturation magnetic flux density Bs can be improved by partially substituting Co for Fe, and that magnetic permeability $\mu$ can be maintained high without a reduction of Bs by partially substituting Ni for Fe.

However, the samples reported in Examples have a saturation magnetic flux density Bs of at most 12,000 G despite high heat resistant temperature.

This means that there is known no soft magnetic thin film having a high saturation magnetic flux density Bs, a low coercive force Hc, and a high magnetic permeability $\mu$ as well as heat resistance.

BRIEF DESCRIPTION OF THE DRAWINGS

FIG. 5 is a graph showing an X-ray diffraction chart of a soft magnetic thin film according to the present invention.

DETAILED DESCRIPTION OF THE INVENTION

Figure 1:
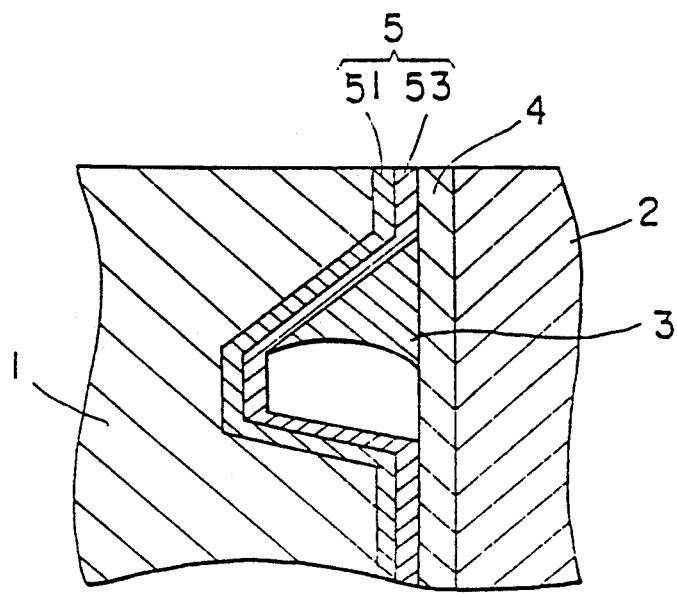
FIGS. 1 and 2 are fragmental cross sections of different embodiment of the MIG type magnetic head according to the present invention, respectively.

The organization of the present invention will be described in more particularity.

The soft magnetic thin film of the present invention best suited for magnetic heads has an atomic ratio composition of the following formula.

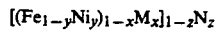

$[(Fe_{1-y}Ni_y)_{1-x}M_x]_{1-z}N_z$

In the formula, M is at least one member selected from the group consisting of Mg, Ca, Ti, Zr, Hf, V, Nb, Ta, Cr, Mo, W, Mn, and B.

Elements other than the above-listed elements, for example, Ru, cause a lowering of saturation magnetic flux density Bs and soft magnetic properties.

Among these elements, Zr alone or V alone, especially Zr alone, or mixtures of at least 20% of the entire M of Zr and/or V and any of the remaining elements other than Zr and V are preferred for enhancing (100) orientation.

Letter x ranges from 0.001 to 0.15.

The preferred upper limit of x is 0.14.

With an x value lower than this range, heat resistance is insufficient so that the coercive force Hc may be markedly increased by heat treatment.

With an x value in excess of this range, films have a lower saturation magnetic flux density Bs so that when applied to magnetic heads, overwrite property is adversely affected.

Soft magnetic thin films which have (100) orientation or an enhanced degree of (100) orientation are obtained particularly when x is at least 0.025, often at least 0.03, preferably at least 0.05, more preferably at least 0.07, most preferably at least 0.08.

With x in the above-defined range, soft magnetic properties are significantly improved and heat resistance is improved.

Letter y ranges from 0 to 0.1, preferably 0 to 0.05.

Magnetic permeability $\mu$ is improved by adding Ni.

Beyond this range, there is a tendency of saturation magnetic flux density Bs lowering.

It is to be noted that when Ni is present as an essential element, its content y should preferably range from 0.01 to 0.1, more preferably from 0.01 to 0.05.

Letter z ranges from 0.001 to 0.15.

With a z value lower than this range, the effect of N to render grains finer becomes insufficient to provide soft magnetic properties.

With a z value beyond this range, more nitrides of Fe, Ni and M would form than necessary, failing to provide soft magnetic properties.

Preferably, the lower limit of z is 0.01, especially 0.02 and the upper limit of z is 0.10, especially 0.05.

In addition to nitrogen, oxygen may be contained in an amount of up to 5 at % of the entire composition, if desired.

The composition of the soft magnetic thin film of the present invention may be determined by electron probe microanalysis (EPMA), for example.

The thickness of the soft magnetic thin film will vary depending on a particular application although it generally ranges from about 0.1 to about 10 $\mu$m.

The soft magnetic thin film of the present invention may be formed by various gas phase methods, for example, evaporation, sputtering, ion plating, and CVD.

Among them, sputtering is the most preferred film forming method which may be carried out as follows, for example.

The target is a cast alloy or sintered alloy while multiple source targets may also be used. Sputtering is carried out in an atmosphere of Ar or another inert gas.

In the case of reactive sputtering, the target may have approximately the same composition as the above-defined formula except N is excluded.

Then sputtering is carried out in an atmosphere containing 0.1 to 15% by volume, preferably 2 to 10% by volume of $N_2$ in Ar.

Outside this range, soft magnetic properties would not be available.

The mode of sputtering is not particularly limited and the sputtering apparatus used is not particularly limited and may be a conventional one.

The operating pressure generally ranges from about 0.1 to about 1.0 Pa.

The other parameters for sputtering including voltage and current may be properly determined for a particular sputtering mode.

After the completion of film formation, the soft magnetic thin film is heat treated.

The heat treatment can enhance the (100) orientation or degree of orientation, significantly improve the soft magnetic properties, and improve the saturation magnetic flux density Bs of the film.

More particularly, when an X-ray diffraction spectrum is examined, the film shows no peak prior to heat treatment because it is generally amorphous, but after heat treatment, the film provides a relative intensity ratio of Fe (200) peak to Fe (110) peak of at least ⅓. As the heat treating temperature is raised, the ratio is increased to 2 or higher and even 3 or higher, and infinitely in some cases, and the saturation magnetic flux density Bs is also improved.

There can be formed soft magnetic thin films having enhanced (100) orientation independent of whether the substrates on which the films are formed are magnetic materials such as ferrite, non-magnetic ceramics or polymer films.

The (100) orientation can be confirmed by an electron diffraction spectrum showing discontinuous diffraction rings from Fe (200) plane.

According to the present invention, in an X-ray diffraction spectrum of the film, the ratio of the relative intensity of an Fe (200) peak to the relative intensity of an Fe (110) peak is at least ⅓, indicating that the (100) orientation is increased over the non-oriented state. Preferably, the ratio is at least 1, more preferably at least 2, most preferably at least 3.

In an X-ray diffraction spectrum using CuKα, the value of 2θ of an Fe (110) peak is about 44.7 degrees and the value of 2θ of an Fe (200) peak is about 65 degrees wherein θ is a diffraction angle.

The preferred heat treating conditions are given below.

Heating rate: about 2°–8° C./min.
Holding temperature: about 200°–800° C., preferably about 400°–750° C., especially about 400°–700° C.
Holding time: about 10–60 minutes
Cooling rate: about 2°–8° C./min.
The atmosphere may be an inert gas such as Ar.

By carrying out heat treatment under these conditions, the soft magnetic thin films are further improved in soft magnetic properties.

The soft magnetic thin films of the invention show the following characteristics, when they are about 1 to 5 μm thick, for example, Coercive force Hc (50 Hz): about 0.1 to 2 Oe, especially about 0.1 to 1 Oe Initial magnetic permeability (5 MHz): about 1,000 to 5,000, especially about 2,000 to 5,000

Saturation magnetic flux density Bs (DC): about 14,000 to 20,000 G, often about 16,000 to 20,000 G, especially about 17,000 to 19,000 G, Mean grain size D: about 50 to 500Å, often about 100 to 300Å, especially about 150 to 250Å

The magnetic properties of soft magnetic thin films, which are to be applied to magnetic heads, for example, may be determined by forming the films on non-magnetic substrates under the same conditions as in the fabrication of magnetic heads, and heat treating them under the same conditions. The subsequent measurement is as follows.

Initial magnetic permeability ($\mu_i$) is measured by using an 8-shaped coil magnetic permeability meter and applying a magnetic field of 5 mOe.

Coercive force (Hc) is measured by means of a B-H tracer.

Saturation magnetic flux density (Bs) is measured by using a vibrating sample magnetometer (VSM) and applying a magnetic field of 10,000 G.

The mean grain size of crystals is determined by measuring the half-width value $W_{50}$ of an Fe (200) peak in an X-ray diffraction spectrum and calculating according to the following Scherer's formula:

$$D = 0.9\lambda / W_{50} \cos\theta$$

wherein λ is the wavelength of X-ray used and θ is a diffraction angle.

The 2θ value of an Fe (200) peak is about 65 degrees in an X-ray diffraction spectrum using CuKα as previously mentioned.

The soft magnetic thin films of the present invention are applicable to various magnetic heads, especially metal-in-gap (MIG) type magnetic heads and thin film magnetic heads.

In addition to the magnetic heads, the thin films are also applicable to various soft magnetic parts, for example, thin film inductors.

Now, the magnetic heads of the present invention are described.

Figure 2:
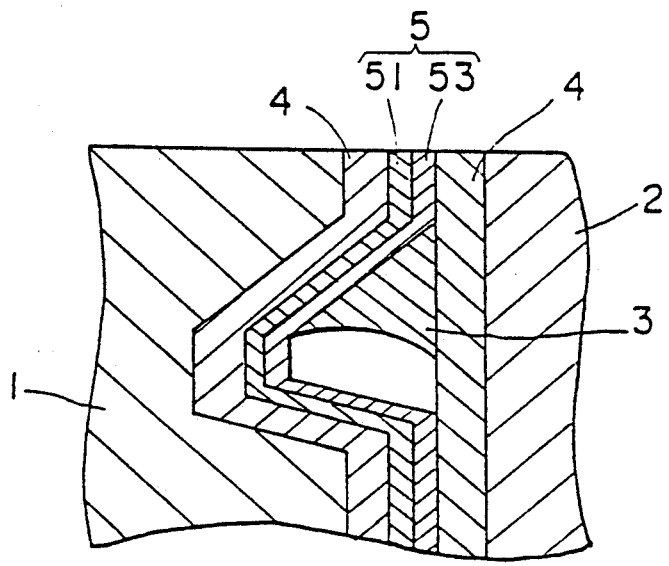

FIGS. 1 and 2 schematically illustrate two preferred embodiments of the MIG type magnetic head of the invention.

The magnetic head shown in FIG. 1 includes a first core 1 and a second core 2 having a soft magnetic thin film 4 formed on the gap-defining opposed surface thereof. The cores 1 and 2 are joined through a gap 5, that is, integrally welded with a fusion welding glass 3.

The magnetic head shown in FIG. 2 has a soft magnetic thin film 4 on each of the gap-defining opposed surfaces of the first and second cores 1 and 2.

The cores 1 and 2 are preferably formed of a ferrite.

The ferrite used herein is not particularly limited although a choice is preferably made of an Mn—Zn or Ni—Zn ferrite depending on a particular purpose.

The Mn—Zn ferrite is preferably comprised of about 50 to 60 mol % of $Fe_2O_3$ and about 8 to 25 mol % of ZnO, the balance being essentially of MnO.

The Ni—Zn ferrite performs well in a high frequency range and is preferably comprised of about 30 to 60 mol % of $Fe_2O_3$, about 15 to 50 mol % of NiO, and about 5 to 40 mol % of ZnO.

The cores 1 and 2 preferably have a saturation magnetic flux density Bs of 3,000 to 6,000 G. With a saturation magnetic flux density below the range, a lowering of overwrite ability might occur and a composition exhibiting such a saturation magnetic flux density has a lower Curie temperature and hence, lower thermal stability. Beyond the range, the magnetic head might be adversely affected by increased magnetorestriction and tends to be readily magnetized.

Preferably, the cores have an initial magnetic permeability $\mu_i$ of at least about 1,000 in a DC mode and a coercive force Hc of up to 0.3 Oe.

Preferably, the gap-defining opposed surfaces of the first and second cores 1 and 2 are smoothed as by mirror finishing such that undercoates and soft magnetic thin films 4 may be subsequently formed thereon with ease.

The soft magnetic thin film 4 can generate a high density of magnetic flux upon recording and is effective for recording of magnetic recording media having a high coercive force.

The soft magnetic thin film 4 used herein is a soft magnetic thin film as defined by the present invention.

The soft magnetic thin film 4 incorporated in the magnetic head preferably has a saturation magnetic flux density Bs of at least 14,000 G, more preferably at least 16,000 G, most preferably at least 17,000 G.

Below the limit, the head has poor overwrite property and is difficult to record information in magnetic recording media having a high coercive force.

The soft magnetic thin film 4 has enhanced (100) orientation, which ensures that the film exhibit improved soft magnetic properties and high recording/reproducing sensitivity.

The soft magnetic thin film 4 preferably has a mean grain size of up to 500Å, more preferably up to 300Å, most preferably 100 to 300Å.

Within this range, improved soft magnetic properties and high recording/reproducing sensitivity are available.

With respect to soft magnetic properties, the soft magnetic thin film 4 incorporated in the magnetic head should preferably have a coercive force Hc of up to 2 Oe, more preferably up to 1 Oe at 50 Hz.

The soft magnetic thin film 4 should preferably have an initial magnetic permeability $\mu_i$ of at least 1,000, more preferably at least 1,500 at 5 MHz.

With a coercive force Hc beyond the range or an initial magnetic permeability $\mu_i$ below the range, there would occur a lowering of recording/reproducing sensitivity.

The thickness of the soft magnetic thin film 4 is preferably 0.2 to 5 $\mu$m thick, more preferably 0.5 to 3 $\mu$m thick.

With a film thickness below this range, the soft magnetic thin film 4 would have an insufficient overall volume to resist saturation, often failing to perform the function of an MIG type magnetic head.

Beyond the range, the soft magnetic thin film 4 would have an increased eddy current loss.

The magnetic head of the invention is effective in recording information in magnetic recording media having a coercive force of at least 800 Oe by virtue of the soft magnetic thin film 4 incorporated therein.

The magnetic head provides a high output and resolution insofar as the cores 1 and 2 and soft magnetic thin film 4 have magnetic properties as mentioned above. A favorable overwrite ability of up to $-35$ dB is available.

The resolution used herein is represented by $(V_{2f}/V_{1f}) \times 100\%$ wherein $V_{1f}$ is an output of 1f signal and $V_{2f}$ is an output of 2f signal.

The overwrite ability is represented, when a 2f signal is written over a 1f signal, by a 1f signal output relative to a 2f signal output.

The gap 5 is formed of a non magnetic material.

Particularly, the gap 5 is formed of welding glass for increased bond strength, for example, the glass disclosed in Japanese Patent Application No. 71506/1989.

The gap may be formed solely of welding glass, but is preferably composed of two layers, gaps 51 and 53 as shown in the figures, for increasing gap formation rate and gap strength.

In the latter embodiment, preferably $SiO_2$ is used as the gap 51 and welding glass is used as the gap 53.

It is to be noted that the gap 5 may be formed solely of silicon oxide in the case of magnetic heads in which welding glass 3 flows to either side of the gap as will be described later.

The gap 5 may be formed by any desired methods, preferably by sputtering.

The gap length generally ranges from about 0.2 to about 2.0 $\mu$m.

In the MIG type magnetic head of the invention, the first and second cores 1 and 2 are integrally joined through the gap 5 as shown in FIGS. 1 and 2.

The cores are generally joined by heat welding the cores through the welding glass as gap 53 under pressure while casting fusion welding glass 3 thereto.

The welding glass 3 used preferably has a working temperature Tw of 450° to 750° C., more preferably 450° to 700° C., most preferably 460° to 650° C.

The working temperature Tw used herein is a temperature at which the viscosity of glass reaches $10^4$ poise as is well known in the art.

Since the soft magnetic thin film 4 used herein is fully heat resistant, the coercive force Hc is maintained at 2 Oe or lower, especially at 1 Oe or lower even when a glass having such Tw is used for welding purposes.

The welding glass 3 is not particularly limited although lead silicate glass is preferred.

One exemplary preferred composition of welding glass is shown below.

| PbO | 67.5–87.5% by weight |
|---|---|
| $B_2O_3$ | 4.0–8.1% by weight |
| $SiO_2$ | 7.5–16.6% by weight |
| $Al_2O_3$ | 0.3–0.8% by weight |
| ZnO | 2.2–3.3% by weight |
| $Bi_2O_3$ | 0–0.1% by weight |
| $Na_2O$, $K_2O$, CaO, etc. | 0–4% by weight |
| $Sb_2O_3$ | 0–1% by weight |

Welding may be carried out by conventional techniques using a welding temperature in proximity to the working temperature Tw.

The welding operation can also serve for the heat treatment of the soft magnetic thin film 4.

Figure 3:
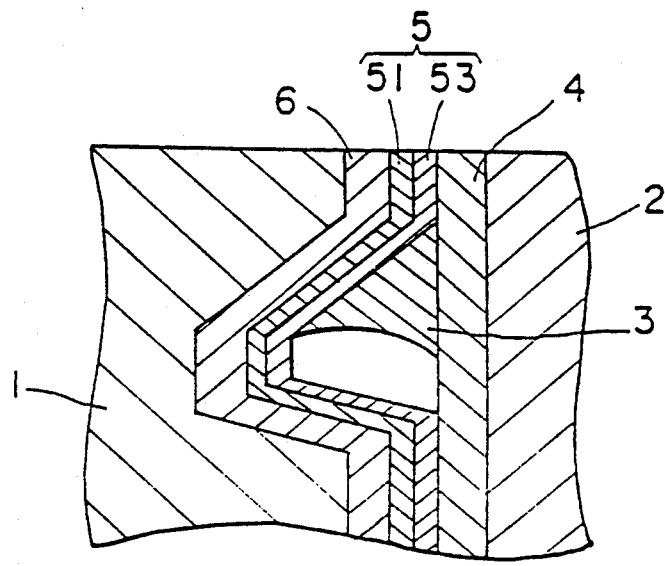
FIG. 3 is a fragmental cross section of one embodiment of the MIG type magnetic head of EDG type according to the present invention.

Also contemplated herein is an EDG type magnetic head, which is a modified MIG type magnetic head in that the first core 1 has formed thereon an alloy thin film 6 having a lower saturation magnetic flux density than the core and the second core 2 has formed thereon the above-defined soft magnetic thin film 4 as shown in FIG. 3.

The EDG type magnetic head has the same advantages as the aforementioned MIG type magnetic heads.

Improved overwrite property and high sensitivity are also available when the low saturation magnetic flux density alloy thin film 6 is formed, for example, from amorphous alloys having a relatively low saturation magnetic flux density as disclosed in Japanese Patent Application No. 311591/1988 (U.S. Ser. No. 356,696 filed May 25, 1989).

The magnetic head of the invention is integrated with a slider if necessary and finished into a head assembly.

It then finds an application as floppy heads capable of overwriting including those of the tunnel erase type known as laminate type heads and bulk type heads and of the read/write type without an erase head; flying heads for computers of the monolithic type and composite type; rotary heads for VCR; and heads for R-DAT.

Using the magnetic head of the invention, overwrite recording can be carried out in various well-known modes.

Next, the thin film type magnetic head of the invention is described.

Figure 4:
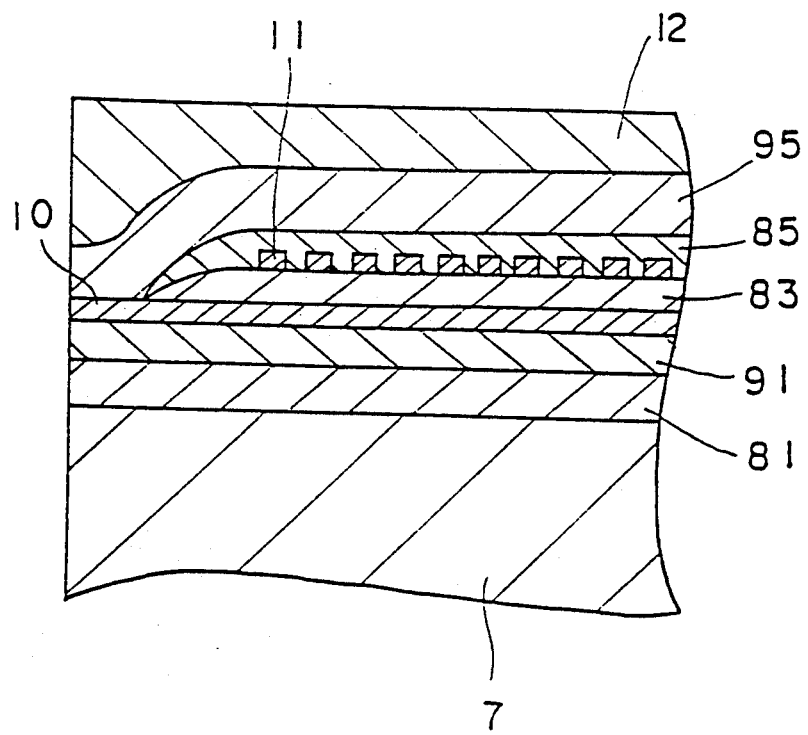
FIG. 4 is a fragmental cross section of one embodiment of the thin film magnetic head according to the present invention.

FIG. 4 illustrates a flying magnetic head of the thin film type according to a preferred embodiment of the present invention.

The thin film magnetic head shown in FIG. 4 includes a slider or base 7, an insulating layer 81, a lower pole layer 91, a gap layer 10, an insulating layer 83, a coil layer 11, an insulating layer 85, an upper pole layer 95, and a protective layer 12 stacked in this order.

The slider 7 may be formed from any well-known materials including ceramics and ferrites.

Examples of ceramic materials include $Al_2O_3$—TiC base ceramic materials, $ZrO_2$ base ceramic materials, SiC base ceramic materials, and AlN base ceramic materials. They may contain an additional component(s) such as Mg, Y, $ZrO_2$, and $TiO_2$.

The shape and dimensions of the slider 7 may be of conventional design and suitably chosen for a particular application.

The insulating layer 81 is formed on the slider 7.

The insulating layer 81 may be formed of any conventional well-known materials. For example, $SiO_2$, glass, $Al_2O_3$ and the like may be used if it is desired to form such layers by sputtering.

The thickness and pattern of the insulating layer 81 may be of conventional design, and it is 5 to 40 $\mu$m thick, for example.

The magnetic poles are generally provided in the form of lower and upper pole layers 91 and 95 as illustrated in FIG. 6.

According to the invention, the lower and upper pole layers 91 and 95 are soft magnetic thin films having an atomic ratio composition of the formula defined herein as in the case of the previously mentioned MIG and EDG/MIG type magnetic heads.

The resulting magnetic head has improved overwrite property and high recording/reproducing sensitivity.

Film formation and heat treatment may be carried out by the same procedures as previously mentioned.

The magnetic pole layers 91 and 95 may be of conventional well-known design with respect to their layer 91 may be about 1 to 5 $\mu$m thick and upper magnetic pole layer 95 may be about 1 to 5 $\mu$m thick, for example.

The gap layer or spacer 10 intervenes between the lower and upper pole layers 91 and 95.

The gap layer 10 may be formed from any well-known materials including $Al_2O_3$ and $SiO_2$.

The gap layer 10 may be of conventional well-known design with respect to its pattern, thickness and the like. It may be about 0.2 to 1.0 $\mu$m thick, for example.

The coil layer 11 may be formed from any desired material, generally from a metal such as Al and Cu.

No particular limits are imposed on the pattern and density of the coil. The coil may be wound in a well-known conventional manner. For example, the coil pattern may be of the spiral type illustrated in FIG. 4, laminate type or zigzag type.

The coil layer 11 may be formed by gas phase deposition techniques such as sputtering or plating techniques.

In the illustrated embodiment, the coil layer 11 is spirally disposed between the lower and upper pole layers 91 and 95 while the insulating layers 83 and 85 intervene between the coil layer 11 and the lower and upper pole layers 91 and 95.

These insulating layers 83 and 85 may be formed from. any well-known materials, for example $SiO_2$, glass, and $Al_2O_3$ when it is desired to form the thin films by sputtering.

The protective layer 12 is present on the upper pole layer 95. The protective layer 12 may be formed from any well-known materials, for example, $Al_2O_3$.

The protective layer 12 may be of conventional well-known design with respect to its pattern, thickness and the like. It may be about 10 to 50 $\mu$m thick, for example.

An additional resinous coating may be laminated, if desired.

Briefly stated, the process for producing such a thin film type flying magnetic head includes thin film formation and patterning.

To form thin films which constitute the respective layers as described above, any well-known vapor phase deposition techniques such as vacuum evaporation and sputtering, and plating techniques.

The respective layers of the head may be patterned by selective etching or selective deposition, which are both well known in the art.

The etching may be either wet or dry etching.

The thin film magnetic head of the invention is usually combined with well-known members such as an arm to form a head assembly.

Using the thin film magnetic head of the invention as far described, various modes of overwrite recording can be carried out, particularly recording/reproducing operation conducted on magnetic recording media having a coercive force Hc of at least 800 Oe.

In the practice of the invention, magnetic heads can also be fabricated by forming a patterned soft magnetic thin film between non-magnetic substrates or by abutting a pair of core halves each having a soft magnetic thin film formed between non-magnetic substrates whereby the soft magnetic thin films constitute a magnetic circuit.

EXAMPLE

Examples of the present invention are given below by way of illustration.

EXAMPLE 1

An MIG type magnetic head as shown in FIG. 1 was fabricated by integrally joining a first core 1 and a second core 2 having a soft magnetic thin film 4 formed on its gap-defining surface through a gap 5.

The cores 1 and 2 are of Mn—Zn ferrite having a saturation magnetic flux density Bs of 5,000 G in DC, an initial magnetic permeability $\mu_i$ of 3,000, and a coercive force Hc of 0.1 Oe.

The soft magnetic thin film 4 was formed by RF magnetron sputtering to a thickness of 1 $\mu$m.

Sputtering was carried out in an atmosphere containing 10% by volume of $N_2$ in Ar using a target of $Fe_{0.85}Zr_{0.15}$ (atomic ratio) alloy. The operating pressure was 0.4 Pa.

The composition, saturation magnetic flux density Bs in DC mode, coercive force Hc at frequency 50 Hz, and initial magnetic permeability $\mu_i$ at frequency 5 MHz of soft magnetic thin film 4 are shown below.

The values of Bs, Hc and $\mu_i$ were measurements after welding heat treatment which was carried out at a temperature of 600° C. for a holding time of 60 minutes.

The magnetic properties were measured by forming a soft magnetic thin film on a non-magnetic substrate under the same conditions as used in the fabrication of the head.

The measuring means were EPMA for composition analysis, a VSM for Bs, a B-H tracer for Hc, and an 8-shaped coil permeability meter (with a magnetic field of 5 mOe applied) for $\mu_i$.

The gap 51 was of $SiO_2$ which was applied by sputtering to a thickness of 0.3 $\mu$m.

The gap 53 was of a welding glass having a working temperature Tw of 650° C. which was applied by sputtering to a thickness of 0.1 $\mu$m.

The welding glass 3 was $72.50PbO-7.05B_2O_3$-$14.57SiO_2-0.55Al_2O_3-2.75ZnO-0.05Bi_2O_3-2.50Na_2O$-$0.30Sb_2O_3$ (% by weight) having a working temperature Tw of 600° C. which was welded at 600° C.

The number of coil turns was 20×2 turns.

A flying magnetic head of the composite type was completed by sealingly securing the head to a slider of calcium titanate.

The thus fabricated magnetic head is designated sample No. 1.

Using this sample and a hard disk having a coercive force of 1,500 Oe and a track width of 14 $\mu$m, the following properties were measured.

On measurement, the first core 1 was located on the hard disk leading side.

OVERWRITE PROPERTY

Overwrite property was evaluated by recording a signal having a frequency 1f of 1.25 MHz in the disk, recording another signal having a frequency 2f of 2.5 MHz thereover, and calculating the output of 1f signal relative to the output of 2f signal.

RECORDING/REPRODUCING SENSITIVITY

A signal of 5 MHz was recorded and then reproduced to measure the voltage value of the reproduced output V'p-p (peak-to-peak).

It is to be noted that Table reports values Vp-p which are obtained by normalizing the measurements V'p-p.

The results are shown below.

Composition (atom ratio): $(Fe_{0.9}Zr_{0.1})_{0.97}N_{0.03}$

Bs: 17,000 G
Hc: 0.5 Oe
$\mu_i$ (5MHz): 3,000
Overwrite property: −40 dB
Vp-p: 1.20 $\mu V/\mu m$/turn The sample was immersed in an aqueous solution of sodium chloride having a concentration of 5% by weight for 168 hours before the soft magnetic thin film 4 on the surface was observed under an electron microscope. Little rust was observed in sample No. 1 according to the present invention.

FIG. 5 is an X-ray diffraction spectrum of the soft magnetic thin film 4 of sample No. 1 after heat treatment.

As seen from this spectrum, the intensity of Fe (200) peak relative to Fe (110) peak is 3.1, indicating that sample No. 1 has enhanced (100) orientation.

The (100) orientation was also observed in an electron diffraction spectrum.

COMPARATIVE EXAMPLE 1

A sample having a thin film of $(Fe_{0.92}Zr_{0.08})_{0.82}N_{0.18}$ was fabricated under the same conditions as in Example 1 except that the target composition and the $N_2$ content in the atmosphere were changed. The results are shown below.

Bs: 16,000 G
Hc: 1 Oe
$\mu_i$ (5MHz): 1,500
Overwrite property: −37 dB
Vp-p: 0.95 $\mu V/\mu m$/turn This sample's intensity of Fe (200) peak relative to Fe (110) peak was 0.

These results reveal the benefits of (100) orientation.

EXAMPLE 2

Metal-in-gap type magnetic heads were fabricated and measured by the same procedures as in Example 1.

The thin films had a composition of $[(Fe_{1-y}Ni_y)_{1-x}M_x]_{0.93-w}N_{0.03}O_w$ wherein M, x, y and w were varied as reported in Table 1.

The results are shown in Table 2.

TABLE 1

| Sample No. | Composition | | | |
|---|---|---|---|---|
| | M | x | y | w |
| 2 (Invention) | Ti | 0.13 | 0 | 0 |
| 3 (Invention) | Hf | 0.10 | 0 | 0 |
| 4 (Invention) | Ta | 0.12 | 0 | 0 |
| 5 (Invention) | Nb | 0.12 | 0 | 0 |
| 6 (Invention) | Zr | 0.10 | 0.02 | 0 |
| 7 (Invention) | Zr | 0.08 | 0.02 | 0 |
| | Ti | 0.02 | | |
| 8 (Invention) | Zr | 0.08 | 0 | 0 |
| | Ti | 0.02 | | |
| 9 (Invention) | Zr | 0.10 | 0 | 0.01 |

TABLE 2

| Sample No. | Soft magnetic thin film | | | Overwrite (dB) | Reproduced voltage Vp-p ($\mu V/\mu m$/turn) |
|---|---|---|---|---|---|
| | Bs (G) | Hc (Oe) | $\mu_i$ @ 5MHz | | |
| 2 (Invention) | 16,000 | 0.5 | 2,500 | −37 | 1.20 |
| 3 (Invention) | 16,500 | 0.6 | 2,300 | −38 | 1.19 |
| 4 (Invention) | 16,000 | 0.7 | 2,200 | −37 | 1.18 |
| 5 (Invention) | 16,000 | 0.5 | 2,500 | −37 | 1.19 |
| 6 (Invention) | 18,000 | 0.4 | 3,500 | −42 | 1.22 |
| 7 (Invention) | 17,800 | 0.4 | 3,500 | −41 | 1.21 |
| 8 (Invention) | 17,500 | 0.5 | 3,000 | −41 | 1.20 |
| 9 (Invention) | 16,800 | 0.4 | 3,000 | −40 | 1.22 |

In sample Nos. 2 to 9, the ratio in relative intensity of Fe (200) peak to Fe (110) peak of the soft magnetic thin film was in the range of from about 1 to about 10, while the (100) orientation was also observed in an electron diffraction spectrum.

The samples of the invention were well resistant against corrosion.

Equivalent results were obtained for additional samples which were prepared as above while changing M in the composition formula within the scope of the invention.

EXAMPLE 3

An EDG type metal-in-gap magnetic head as shown in FIG. 3 was fabricated by integrally joining a first core 1 having an alloy thin film 6 having a lower saturation magnetic flux density Bs than the core formed on its gap-defining surface and a second core 2 having a soft magnetic thin film 4 formed on its gap-defining surface through a gap 5.

Measurements were made as in Example 1, with equivalent results.

EXAMPLE 4

A thin film magnetic head as shown in FIG. 4 was fabricated which had insulating layer 81, lower pole layer 91, gap layer 10, insulating layer 83, coil layer 11, insulating layer 85, upper pole layer 95, and protective layer 12 successively stacked on slider 7. The respective layers were formed by sputtering and patterned by dry etching.

The slider 7 was of $Al_2O_3$—TiC.

The insulating layer 81 was of $Al_2O_3$ and 30 μm thick.

The lower and upper pole layers 91 and 95 were soft magnetic thin films of sample Nos. 1 to 9.

The lower and upper pole layers 91 and 95 were formed by RF magnetron sputtering in the same manner as the soft magnetic thin film 4 of Example 1 and each had a thickness of 3 μm.

The saturation magnetic flux density Bs in DC mode, coercive force Hc at frequency 50 Hz, and initial magnetic permeability $\mu_i$ at frequency 5 MHz of pole layers 91 and 95 are shown in Table 2.

The heat treating conditions included a heat treating temperature of 350° C. and a holding time of 60 minutes.

The gap layer 10 was of $SiO_2$ and 0.25 μm thick.

The coil layer 11 was formed of Cu in a spiral form as shown in the figure.

The insulating layers 83 and 85 were of $Al_2O_3$.

The protective layer 12 was of $Al_2O_3$ and 40 μm thick.

Magnetic head sample Nos. 2 to 9 of the invention were fabricated in this way.

Using these samples and hard disks having a coercive force of 1,500 Oe, measurements were made as in Example 1.

The results are shown in Table 3.

TABLE 3

| Sample No. | Soft magnetic thin film | | | Over-write (dB) | Reproduced voltage Vp-p (μV/μm/turn) |
|---|---|---|---|---|---|
| | Bs (G) | Hc (Oe) | μi @ 5MHz | | |
| 1 (Invention) | 15,000 | 0.5 | 3,000 | −36 | 1.20 |
| 2 (Invention) | 14,000 | 0.5 | 2,500 | −35 | 1.20 |
| 3 (Invention) | 14,500 | 0.6 | 2,300 | −35 | 1.19 |
| 4 (Invention) | 15,000 | 0.7 | 2,200 | −36 | 1.18 |
| 5 (Invention) | 15,000 | 0.5 | 2,500 | −36 | 1.19 |
| 6 (Invention) | 17,000 | 0.4 | 3,500 | −37 | 1.22 |
| 7 (Invention) | 16,800 | 0.4 | 3,500 | −36 | 1.21 |
| 8 (Invention) | 16,500 | 0.5 | 3,000 | −35 | 1.20 |
| 9 (Invention) | 15,800 | 0.4 | 3,000 | −35 | 1.22 |

With respect to the lower and upper magnetic pole layers 91 and 95 of sample Nos. 1 to 9, the ratio in relative intensity of Fe (200) peak to Fe (110) peak in an X-ray diffraction spectrum was in the range of from about 1 to about 10, while the (100) orientation was also observed in an electron diffraction spectrum.

The samples of the invention were also well resistant against corrosion.

The foregoing data show the effectiveness of the invention.

BENEFITS OF THE INVENTION

The soft magnetic thin films of the present invention have a high saturation magnetic flux density Bs. In addition, they are heat resistant and have improved soft magnetic properties including a low coercive force Hc and a high magnetic permeability μ due to enhanced (100) orientation.

Therefore, the magnetic heads of the present invention having satisfactory overwrite property, high recording/reproducing sensitivity, and improved electromagnetic properties.

The soft magnetic thin films of the present invention are resistant against corrosion and wear and allow for the fabrication of highly reliable magnetic heads.

We claim:

1. A magnetic head comprising a soft magnetic thin film having an atomic ratio composition of the formula:

$$((Fe_{1-y}Ni_y)_{1-x}M_x)_{1-z}N_z$$

wherein M is Zr or a mixture of Zr and at least one member selected from the group consisting of Mg, Ca, Ti, Hf, V, Nb, Ta, Cr, Mo, W, Mn, and B, $0.08 \leq x \leq 0.15$, $0 \leq y \leq 0.1$, and $0.001 \leq z \leq 0.15$, and having a relative intensity ratio of Fe (200) peak to Fe (110) peak in an X-ray diffraction spectrum of at least ½; said film being between a pair of cores.

2. A magnetic head comprising a soft magnetic thin film having an atomic ratio composition of the formula:

$$((Fe_{1-y}Ni_y)_{1-x}M_x)_{1-z}N_z$$

wherein M is Zr or a mixture of Zr and at least one member selected from the group consisting of Mg, Ca, Ti, Hf, V, Nb, Ta, Cr, Mo, W, Mn, and B, $0.08 \leq x \leq 0.15$, $0 \leq y \leq 0.1$, and $0.001 \leq z \leq 0.15$, and having Fe (200) plane orientation in an electron diffraction spectrum; said film being between a pair of cores.

3. The magnetic head comprising a soft magnetic thin film of claims 1 or 2 which has been heat treated at a temperature of 200° to 800° C.

4. The magnetic head comprising a thin film of claims 1 or 2 which has a saturation magnetic flux density Bs of at least 14,000 G and a coercive force Hc of up to 2 Oe.

5. The magnetic head of claims 1 or 2 wherein the pair of cores are integrally welded with a fusion welding glass having a working temperature Tw of 450° to 750° C.

6. In a thin film magnetic head comprising an upper magnetic pole layer, a lower magnetic pole layer, and a protective layer.

the improvement wherein said upper and lower magnetic pole layers are formed of a soft magnetic thin film according to claims 1 or 2.

7. A magnetic head comprising a soft magnetic thin film according to claims 1 or 2 formed on a substrate, said thin film constituting a magnetic circuit.

* * * * *